(12) United States Patent
Park

(10) Patent No.: US 11,394,474 B2
(45) Date of Patent: Jul. 19, 2022

(54) SATELLITE TRACKING ANTENNA SYSTEM IN A PLURALITY OF SATELLITE ENVIRONMENTS AND SATELLITE TRACKING METHOD USING THE SAME

(71) Applicant: WIWORLD CO., LTD., Daejeon (KR)

(72) Inventor: Chan Goo Park, Daejeon (KR)

(73) Assignee: WIWORLD CO., LTD., Daejeon (KR)

( * ) Notice: Subject to any disclaimer, the term of this patent is extended or adjusted under 35 U.S.C. 154(b) by 85 days.

(21) Appl. No.: 16/829,620

(22) Filed: Mar. 25, 2020

(65) Prior Publication Data
US 2020/0313780 A1    Oct. 1, 2020

(30) Foreign Application Priority Data

Mar. 29, 2019    (KR) .................. 10-2019-0036449

(51) Int. Cl.
| | | |
|---|---|---|
| *H04B 17/27* | (2015.01) | |
| *H04B 17/318* | (2015.01) | |
| *G01S 19/06* | (2010.01) | |
| *H04B 7/185* | (2006.01) | |

(52) U.S. Cl.
CPC ............. *H04B 17/27* (2015.01); *G01S 19/06* (2013.01); *H04B 7/18506* (2013.01); *H04B 7/18521* (2013.01); *H04B 17/318* (2015.01)

(58) Field of Classification Search
CPC .. H04B 17/27; H04B 17/318; H04B 7/18506; H04B 7/18521; H04B 7/1851; G01S 19/06; G01S 19/26; G01S 19/28; H01Q 1/1257; H01Q 3/005; H01Q 3/08; H01Q 3/02

See application file for complete search history.

(56) References Cited

U.S. PATENT DOCUMENTS

| | | | | |
|---|---|---|---|---|
| 3,331,071 A | | 7/1967 | Webb | |
| 6,175,327 B1 * | | 1/2001 | Lin ..................... | H01Q 3/2611 342/357.64 |
| 6,310,582 B1 * | | 10/2001 | Uetake .................. | H01Q 1/125 343/890 |
| 8,789,116 B2 * | | 7/2014 | Miller .................. | H04N 21/426 343/839 |
| 2007/0103366 A1 | | 5/2007 | Park | |

(Continued)

FOREIGN PATENT DOCUMENTS

| | | |
|---|---|---|
| FR | 2762936 A1 | 11/1998 |
| GB | 2386477 A | 9/2003 |

(Continued)

OTHER PUBLICATIONS

Extended European Search Report of European Application No. 20164852.4—9 pages (dated Sep. 21, 2020).

*Primary Examiner* — Tejis Daya
(74) *Attorney, Agent, or Firm* — Knobbe Martens Olson & Bear LLP

(57) ABSTRACT

Provided are satellite tracking antenna system in a plurality of satellite environments and a satellite tracking method using the same, and more particularly, satellite tracking antenna system and method in a plurality of satellite environments, which may receive a satellite signal by stochastically estimating and tracking a target satellite using pre-stored information on satellite orbits, without information on satellite network identity (NID) for every received satellite signal.

9 Claims, 3 Drawing Sheets

(56) References Cited

U.S. PATENT DOCUMENTS

| | | | | |
|---|---|---|---|---|
| 2011/0102251 | A1* | 5/2011 | Morrison | G01S 19/252 |
| | | | | 342/357.23 |
| 2013/0044025 | A1* | 2/2013 | Chiu | G01S 19/28 |
| | | | | 342/357.25 |
| 2013/0295846 | A1* | 11/2013 | Krutt | H04W 4/80 |
| | | | | 455/41.1 |
| 2014/0180585 | A1* | 6/2014 | Balogh | H04L 67/12 |
| | | | | 701/533 |
| 2014/0315483 | A1* | 10/2014 | Park | H04B 7/18523 |
| | | | | 455/3.02 |
| 2017/0085314 | A1* | 3/2017 | Davis | G01S 19/42 |
| 2018/0083667 | A1* | 3/2018 | Wells | H04B 5/0031 |
| 2019/0393930 | A1* | 12/2019 | Wahlberg | H01Q 3/08 |

FOREIGN PATENT DOCUMENTS

| | | |
|---|---|---|
| KR | 10-0392253 B1 | 7/2003 |
| KR | 10-2004-0047122 A | 6/2004 |

\* cited by examiner

[FIG. 1]
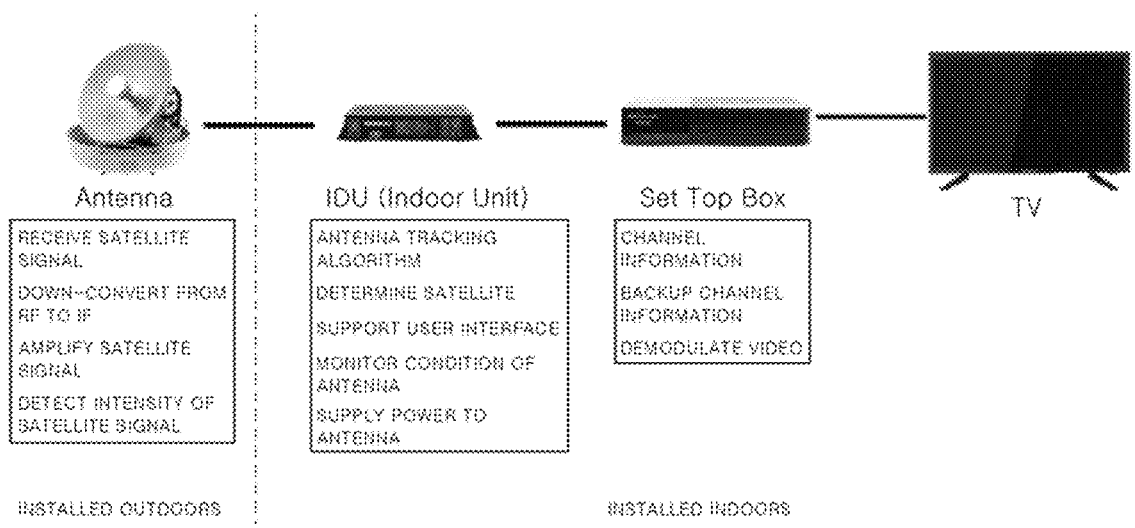
[FIG. 2]
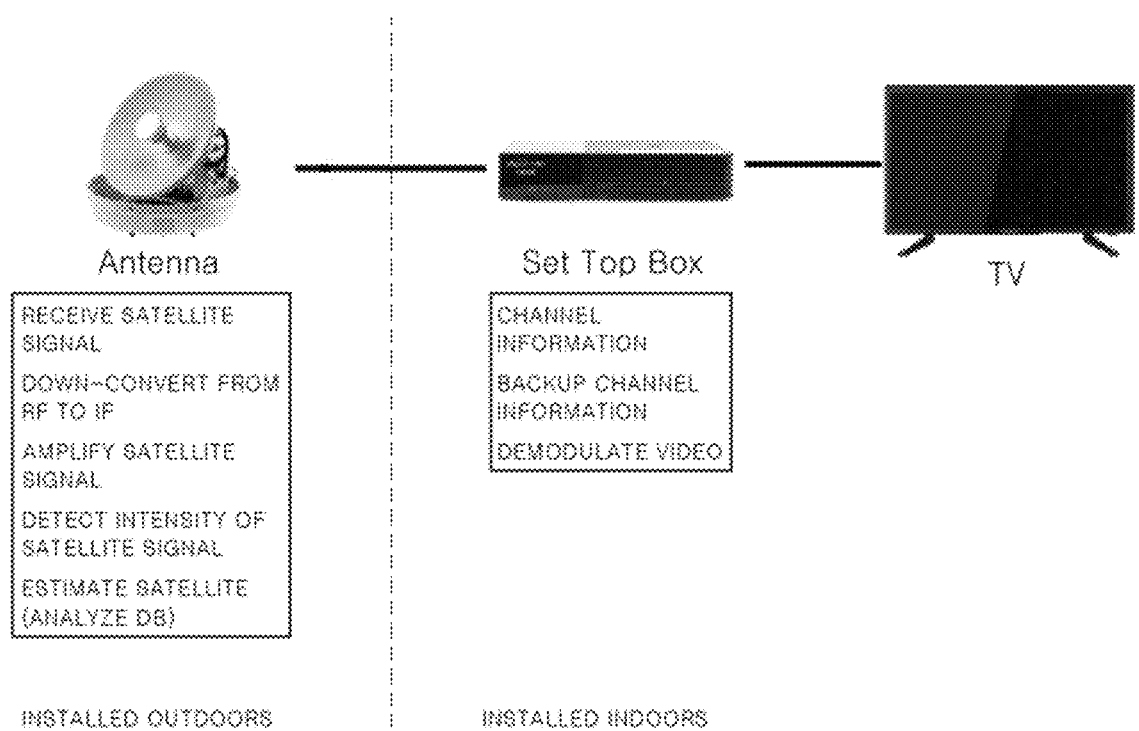

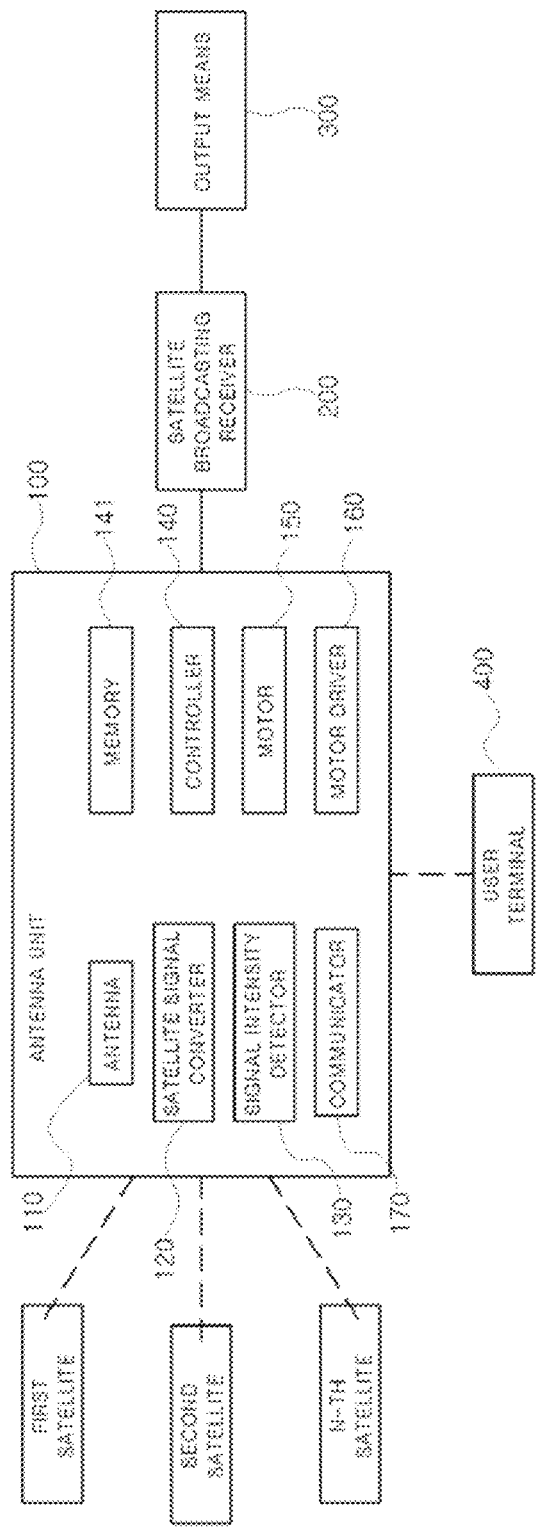
[FIG. 3]

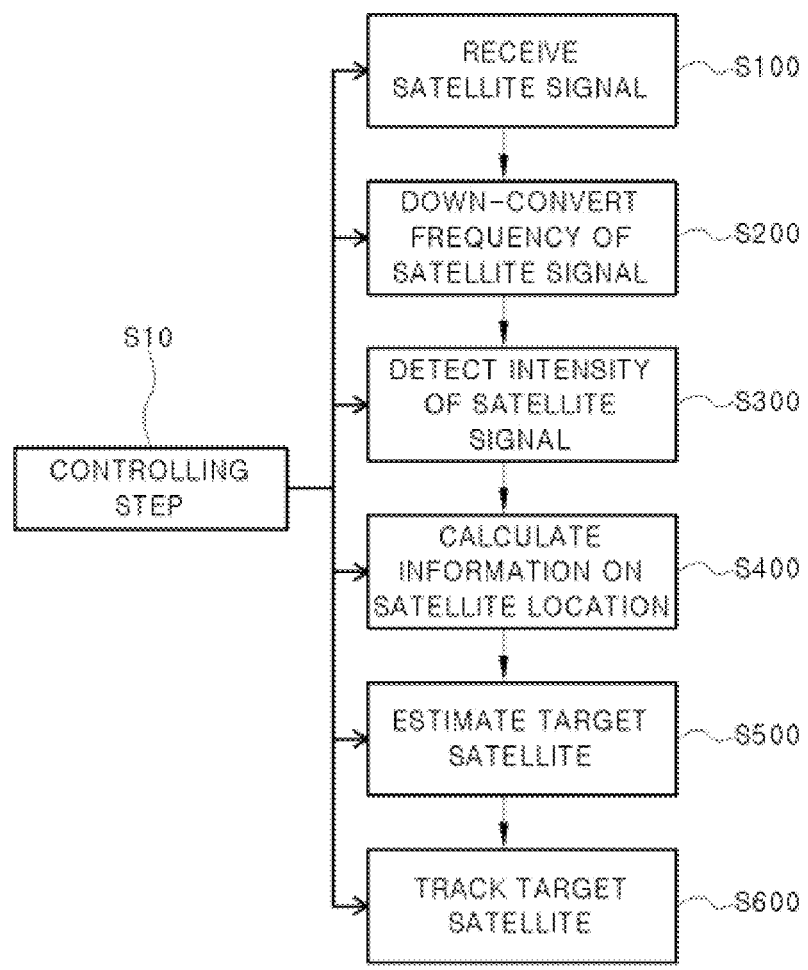

SATELLITE TRACKING ANTENNA SYSTEM IN A PLURALITY OF SATELLITE ENVIRONMENTS AND SATELLITE TRACKING METHOD USING THE SAME

CROSS-REFERENCE TO RELATED APPLICATIONS

This application claims priority under 35 U.S.C. § 119 to Korean Patent Application No. 10-2019-0036449, filed on Mar. 29, 2019 in the Korean Intellectual Property Office, the disclosure of which is incorporated herein by reference in its entirety.

TECHNICAL FIELD

The following disclosure relates to satellite tracking antenna system in a plurality of satellite environments and a satellite tracking method using the same.

BACKGROUND

In Europe, there are many satellites. Each satellite may have identical polarizations and repeaters, and thus satellite signals may often overlap each other.

Each satellite may be set to a different orbit, and may thus have different elevation and azimuth angle. However, due to a narrow distance among satellite orbits, it is not certain whether a received satellite signal is a satellite signal of a target satellite without separate satellite identification.

Therefore, the target satellite may be more accurately tracked: by first estimating the target satellite through polarization information, frequency information and the like obtained through information from the satellite repeater; by determining whether the estimated target satellite has the same polarization, symbol rate, frequency and the like as those of the target satellite checked through the indoor unit (IDU); and by determining whether the estimated target satellite has the same network identity (NID) as that included in the satellite signal of the target satellite detected by the NID database.

That is, the IDU is an essential component of an antenna system because the IDU may control on/off of the antenna, monitor a condition of the antenna, and estimate and track the target satellite in a plurality of satellite environments through tuner control. However, connection and installation methods of the antenna, IDU and set-top box may be very complicated, and a non-professional user may thus have difficulties in installing or maintaining this system himself/herself.

In addition, as a satellite condition changes, it may be troublesome to update the tracking frequency, polarization and the like of the target satellite by updating the antenna firmware. The reason is that the antenna firmware may be updated by downloading firmware update data through a separate storage means and then by uploading the firmware update data downloaded to the IDU.

In addition, in the antenna system installed in a vehicle and connected to the vehicle battery supplies, current consumption may not be limited because the IDU serves to supply power. Therefore, a vehicle may inevitably have greater battery consumption.

In this regard, KR10-0392253B1 discloses an active antenna system and its tracking method capable of receiving a satellite signal of a desired satellite while it is moving in an environment of a plurality of satellite signals having the same polarization and the same frequency and coping with changes in a level of receiving the satellite signal, a tracking frequency, a bandwidth of a tracked channel and the like, based on a change in a region to receive the satellite signal.

CITED REFERENCE

Patent Document

KR10-0392253B1 (Jul. 9, 2003)

SUMMARY

An embodiment of the present disclosure is directed to providing satellite tracking antenna system in a plurality of satellite environments and satellite tracking method using the same, which may estimate and track a target satellite in the plurality of satellite environments without an indoor unit (IDU).

In addition, another embodiment of the present disclosure is directed to providing a low current antenna system with low current consumption by not using the IDU.

In one general aspect, a satellite tracking antenna system in a plurality of satellite environments includes: an antenna unit including: an antenna receiving a satellite signal from at least one satellite in the plurality of satellite environments, a satellite signal converter down-converting a frequency of the satellite signal received by the antenna to an intermediate frequency, a signal intensity detector detecting intensity of the satellite signal having the frequency down-converted by the satellite signal converter and a controller estimating and tracking a target satellite corresponding to the satellite signal by using information on the intensity of the satellite signal detected by the signal intensity detector and pre-stored information on orbits of a plurality of satellites; and a satellite broadcasting receiver transmitting the satellite signal transmitted from the antenna unit to an output means, wherein the controller may estimate the target satellite by calculating information on satellite location corresponding to the satellite signal detected by the signal intensity detector and then by comparing and analyzing the calculated information on the satellite location with the pre-stored information on the orbits of the plurality of satellites.

The signal intensity detector may detect the intensity of the satellite signal only when the intensity of the satellite signal is greater than a predetermined threshold value.

In addition, the antenna unit may further include a memory storing and managing the information on the orbits of the plurality of satellites as its database, and the controller may calculate information on satellite orbit distances based on the antenna by comparing and analyzing the information on the satellite orbits of the memory with the information on the satellite location.

In addition, the controller may estimate a satellite having the closest orbit distance among the information on the satellite orbit distances as the target satellite.

In addition, the antenna unit may further include a motor moving the antenna to an estimated location of the target satellite and a motor driver driving the motor based on a driving signal of the controller.

In addition, the satellite tracking antenna system in a plurality of satellite environments may further include a user terminal having an application installed therein, the application generating a control signal for controlling the antenna unit based on an input signal.

In addition, the antenna unit may further include a communicator to perform near field communication (NFC) with the user terminal, and the communicator may receive the control signal for estimating and tracking the target satellite through the near field communication (NFC) with the user terminal.

In another general aspect, a satellite tracking antenna method in a plurality of satellite environments includes: a satellite signal receiving step of receiving the satellite signal from at least one satellite in the plurality of satellite environments, by an antenna unit; a frequency converting step of down-converting a frequency of the satellite signal received in the satellite signal receiving step to an intermediate frequency, by the antenna unit; a satellite signal intensity detecting step of detecting the intensity of the satellite signal having the frequency down-converted in the frequency converting step, by the antenna unit; a location calculating step of calculating information on the satellite location corresponding to information on the intensity of the satellite signal detected in the satellite signal intensity detecting step, by the antenna unit; an analyzing step of estimating a target satellite corresponding to the satellite signal by comparing and analyzing the calculated information on the satellite location in the location calculating step with pre-stored information on orbits of a plurality of satellites, by the antenna unit; and a tracking step of moving an antenna to an estimated location of the target satellite in the analyzing step, by the antenna unit, wherein in the analyzing step, a satellite having the closest orbit distance may be estimated as the target satellite by comparing and analyzing the information on the satellite location with the pre-stored information on the orbits of the plurality of satellites, and then by calculating information on satellite orbit distances based on the antenna.

In the satellite signal intensity detecting step, the intensity of the satellite signal may be detected only when the intensity of the satellite signal is greater than a predetermined threshold value.

The satellite tracking antenna method in a plurality of satellite environments may further include a controlling step of receiving a control signal for estimating and tracking the target satellite from a user terminal, by the antenna unit.

Other features and aspects are apparent from the following detailed description, the drawings and the claims.

BRIEF DESCRIPTION OF THE DRAWINGS

FIG. 1 is an example of a satellite tracking antenna system.

FIG. 2 is an exemplary configuration of a satellite tracking antenna system in a plurality of satellite environments according to an embodiment of the present disclosure.

FIG. 3 is a configuration of a satellite tracking antenna system in a plurality of satellite environments according to an embodiment of the present disclosure.

FIG. 4 is a flowchart of a satellite tracking method using a satellite tracking antenna system in a plurality of satellite environments according to an embodiment of the present disclosure.

DETAILED DESCRIPTION OF EMBODIMENTS

Hereinafter, satellite tracking antenna system in a plurality of satellite environments and satellite tracking method using the same according to embodiments of the present disclosure are described in detail with reference to the accompanying drawings. The accompanying drawings to be provided below are provided by way of example to sufficiently transfer the idea of the present disclosure to those skilled in the art to which the present disclosure pertains. Therefore, the present disclosure is not limited to the drawings to be provided below, but may be implemented in other forms. In addition, like reference numerals denote like elements throughout the specification.

Technical terms and scientific terms used in the present specification have the general meaning understood by those skilled in the art to which the present disclosure pertains unless otherwise defined, and a description for the known function and configuration unnecessarily obscuring the gist of the present disclosure is omitted in the following description and the accompanying drawings.

In addition, a system means a set of components including devices, mechanisms, means and the like, systematized in order to perform required functions and regularly interacting with one another.

A satellite tracking antenna system in the plurality of satellite environments and satellite tracking method using the same according to an embodiment of the present disclosure are provided to estimate and track the desired satellite (i.e., target satellite) in the plurality of satellite environments without connection to the IDU.

As shown in FIG. 1, a satellite tracking antenna system may generally include an antenna, an indoor unit (IDU), a satellite broadcasting receiver (set-top box), and an output means (television (TV)).

In a plurality of satellite environments such as Europe, there are many identical polarizations and repeaters for each satellite, and thus satellite signals may inevitably overlap each other.

(For example, in Europe, the satellite signals such as ASTRAs 1, 2, 3 and 4, Hotbird, Eutelsat 9E, Eutelsat 5W, Turksat, Hellasat, Hispasat and the like may often overlap each other).

As such, if there are many satellites and many frequencies overlapping each other, a target satellite cannot be accurately determined without satellite identification.

Therefore, the target satellite may generally be tracked: by first estimating the target satellite through polarization information, frequency information and the like obtained through information from the satellite repeater; by confirming polarization information, symbol rate information, and tracking frequency information of the target satellite through the IDU; and by identifying the same number of the target satellite through the network identity (NID) database.

On the other hand, in Korea and Japan, even though the Korean satellite and the Japanese satellite are located close to each other, repeaters on coverage or spectrum do not overlap each other. Therefore, the target satellite may be tracked by selecting a tracking frequency without NID identification.

That is, if it is determined that there is a satellite, the antenna may be set to track a corresponding point, and thus the antenna alone may be operated without the IDU. However, since it is difficult to supply sufficient power to operate the antenna through the satellite broadcasting receiver, it is common to have a separate power supply means, a power insert.

In Korea and Japan, this system is possible because the satellite signals do not overlap each other. However, if a plurality of satellite signals overlap each other as in Europe, a satellite signal of the target satellite is totally impossible to be specified by the antenna system as used in Korea and Japan.

In addition, a current antenna system in Europe necessarily requires the IDU, and thus the antenna system may inevitably have an increased cost due to a configuration of the IDU itself. Connection and installation methods of the antenna, IDU and satellite broadcasting receiver may be complicated, and it is almost impossible for an ordinary user to install and maintain this system.

In addition, an antenna system installed on the vehicle, in order to update the antenna firmware based on a change in a satellite condition, the update may be performed only through the IDU. Current consumption of the IDU may increase battery consumption of a vehicle.

For example, the satellite antenna system shown in FIG. 1 may track the satellite by detecting intensity of the satellite signal while changing the elevation and azimuth angles using a satellite tracking method of a positioner-type antenna system; may identify the tracking frequency, polarization, symbol rate, digital video broadcasting (DVB)-S/S2 method and NID of the satellite in the spot if it is determined that there is the satellite; and may maintain the antenna at a corresponding position if the satellite is identified. While maintaining its position, the antenna may convert power of the IDU to hibernation mode, and drive a low noise block down converter (LNB) with power of the receiver to enable a watcher to watch satellite broadcasts through an output means (television (TV)) connected thereto.

As described above, the satellite antenna system shown in FIG. 1 may require a configuration of the IDU for the satellite identification if there are many satellites and many frequencies overlapping each other, and have inconvenience of including the configuration of the IDU and unnecessary current consumption by the IDU.

As shown in FIG. 2, however, satellite tracking antenna system in a plurality of satellite environments and satellite tracking method using the same according to an embodiment of the present disclosure may perform estimation and tracking of a satellite using only a satellite signal received by an antenna and information on a corresponding satellite orbit without an indoor unit (IDU).

In particular, there is no configuration of the IDU, and power supply may thus be possible directly by a receiver by the antenna. The antenna, satellite broadcasting receiver (set-top box) and output means (television (TV)) may be simply connected to each other and an ordinary user may thus easily install and maintain this system.

However, in the satellite tracking antenna system in the plurality of satellite environments and the satellite tracking method using the same according to an embodiment of the present disclosure, there is no configuration of the IDU to control the antenna. It is thus preferable to receive a control signal through a user terminal (smartphone or the like) to control the antenna, which is described below in detail.

FIG. 3 is a configuration of a satellite tracking antenna system in a plurality of satellite environments according to an embodiment of the present disclosure. The satellite tracking antenna system in the plurality of satellite environments according to an embodiment of the present disclosure is described in detail with reference to FIG. 3.

As shown in FIG. 3, the satellite tracking antenna system in the plurality of satellite environments according to an embodiment of the present disclosure may be preferably configured to include an antenna unit 100 and a satellite broadcasting receiver 200 transmitting the satellite signal transmitted from the antenna unit 100 to an output means 300.

The satellite broadcasting receiver 200 may preferably be configured to include the set-top box, and the output means 300 may preferably be configured to include the TV.

As described above, the satellite tracking antenna system in the plurality of satellite environments according to an embodiment of the present disclosure is an antenna system for estimating and tracking a desired satellite (target satellite) while receiving satellite signals from a plurality of satellites in an environment in which the plurality of satellites exist. To this end, as shown in FIG. 3, the antenna unit 100 may preferably be configured to include an antenna 110, a satellite signal converter 120, a signal intensity detector 130 and a controller 140.

Each component is described in detail as follows.

The antenna 110 may receive the satellite signal from at least one satellite in the plurality of satellite environments, and the satellite signal converter 120 may down-convert a frequency of the satellite signal received by the antenna 110 to an intermediate frequency.

To this end, the satellite signal converter 120 may preferably be configured to include low noise block down converter (LNB). The satellite signal converter 120 may amplify the satellite signal, remove noise included in the satellite signal and down-convert the frequency of the satellite signal received by the antenna 110 to the intermediate frequency.

Here, the satellite signal converter 120 may have different polarizations high/horizontal (HH), high/vertical (HV), low/horizontal (LH) and low/vertical (LV), which may be supported based on a configuration of the LNB, and the polarization may be determined by power input to the LNB. The present disclosure does not limit the configuration of the LNB or the polarization supported based thereon.

In addition, the antenna unit 100 may preferably be configured to further include a power divider (not shown) dividing the satellite signal having the frequency down-converted through the satellite signal converter 120 into a satellite signal having two identical frequencies.

The signal intensity detector 130 may detect intensity of the satellite signal having the down-converted frequency through the power divider.

In detail, the signal intensity detector 130 may preferably detect the intensity of the satellite signal by outputting an automatic gain control (AGC) signal having a set frequency.

Here, the frequency may be set through an operation of the IDU as shown in FIG. 1. However, the present disclosure does not include the IDU, and it is thus preferable to input the control signal for setting the frequency from the outside.

To this end, as shown in FIG. 3, the satellite tracking antenna system in the plurality of satellite environments according to an embodiment of the present disclosure may preferably be configured to further include a user terminal 400 including a smart phone and capable of performing near field communication (NFC).

In detail, an application may most preferably be installed in the user terminal 400 in advance, the application being capable of generating the control signal for controlling the antenna unit 100 based on an input signal input by an external user.

The antenna unit 100 may be configured to include a communicator 170 to perform communication with the user terminal 400.

Here, the communicator 170 may preferably perform the near field communication (NFC) so that the antenna unit 100 uses a global positioning system (GPS) signal of the user terminal 400 to predict location information on which the antenna 110 is installed (equipped). In addition, the satellite broadcasting receiver 200 may supply a driving power to the antenna unit 100 based on the control signal of the user terminal 400.

The user terminal 400 may also preferably be configured to perform the near field communication (NFC) such as bluetooth, and may transmit the control signal generated through the application to the antenna unit 100 through the near field communication (NFC).

That is, in detecting the intensity of the satellite signal by outputting the AGC signal of the frequency set by the signal intensity detector 130, the control signal for setting the frequency may most preferably be received through the near field communication (NFC) with the user terminal 400.

The intensity of the satellite signal may be preferably detected by converting the AGC signal output from the signal intensity detector 130 into an analog-to-digital signal through an analog-to-digital converter (not shown) and then by analyzing the converted signal.

Here, it may be preferable that the signal intensity detector 130 detects the intensity of the satellite signal only when the intensity of the satellite signal is greater than a predetermined threshold value, or detects all satellite signals, but transmits information on the intensity of the satellite signal to the controller 140 only when the intensity of the satellite signal is greater than the predetermined threshold value.

That is, the signal intensity detector 130 may preferably transmit the information on the intensity of the satellite signal to the controller 140 only when the intensity of the satellite signal is greater than a noise, i.e. the predetermined threshold value of a corresponding region.

Through this configuration, it is preferable not to perform any further estimation or tracking for a satellite signal having a weak signal intensity among a plurality of satellite signals received by the antenna 110.

The controller 140 may preferably estimate and track the target satellite corresponding to the satellite signal by using the information on the intensity of the satellite signal detected by the signal intensity detector 130 and pre-stored information on orbits of the plurality of satellites.

To this end, the antenna unit 100 may preferably be configured to further include a memory 141, and the memory 141 may preferably store and manage the information on the orbits of the plurality of satellites as its database.

The information on the satellite orbits may preferably be configured to include elevation and azimuth angles of the plurality of satellites, which are the information on the orbits of the plurality of satellites.

In addition, the controller 140 may calculate the information on the satellite location corresponding to the information on the intensity of the satellite signal detected by the signal intensity detector 130.

Here, the satellite signal detected by the signal intensity detector 130 may correspond to a case where the intensity of the satellite signal is greater than the predetermined threshold value as described above.

The controller 140 may preferably calculate the information on the satellite location corresponding to the satellite signal detected by the signal intensity detector 130. In other words, the controller 140 may preferably calculate the information on the satellite location by calculating the elevation and azimuth angles of location where the satellite signal is detected.

Here, as described above, if the GPS signal of the user terminal 400 is transmitted and used, the information on the location where the satellite signal is detected may become more accurate. It is thus possible to improve the accuracy in calculating the information on the satellite location by calculating the elevation and azimuth angles of the detected satellite signal.

That is, through this system, the controller 140 may calculate information on satellite orbit distances based on the antenna 110 by comparing and analyzing the information on the satellite orbits stored and managed by the memory 141 with the calculated information on the satellite location.

In other words, the controller 140 may calculate the information on the satellite location corresponding to the satellite signal detected by the signal intensity detector 130 by calculating the elevation and azimuth angles of the location where the corresponding satellite signal is detected. The controller 140 may compare and analyze the pre-stored information on the orbits of the plurality of satellites with the calculated information on the satellite location.

Accordingly, the controller 140 may calculate the information on the satellite orbit distance based on the location where the satellite signal is detected.

Based on this calculation, the controller 140 may preferably estimate a satellite having the closest orbit distance among the information on the satellite orbit distances as the target satellite.

In other words, the satellite having the information on the orbit distance closest to the location where the satellite signal is detected may be estimated as the target satellite.

In detail, the controller 140 may preferably be configured to include an algorithm for estimating (detecting) the target satellite by: generating a set of signals including a signal recognized as that of the target satellite among the satellite signals detected by the signal intensity detector 130; calculating an angular value of the satellite based on each signal in the generated set of signals; and using a correlation between the calculated angular value of the satellite and the generated set of signals.

In addition, the antenna unit 100 may preferably be configured to include a motor 150 and a motor driver 160 to track the target satellite estimated through the controller 140.

It may be preferable that the motor 150 moves the antenna 110 to location of the target satellite estimated by the controller 140, and the motor driver 160 drives the motor 150 based on a driving signal of the controller 140.

It may be preferable that the antenna 110 moved in this way has a fixed position and the satellite signal is then transmitted to the satellite broadcasting receiver 200 and output through the output means 300. Here, it is most preferable that the satellite signal transmitted to the satellite broadcasting receiver 200 has the frequency down-converted to the intermediate frequency divided through the power divider.

FIG. 4 is a flowchart of a satellite tracking method using a satellite tracking antenna system in a plurality of satellite environments according to an embodiment of the present disclosure. The satellite tracking method using the satellite tracking antenna system in the plurality of satellite environments according to an embodiment of the present disclosure is described in detail with reference to FIG. 4.

As shown in FIG. 4, the satellite tracking antenna method in the plurality of satellite environments according to an embodiment of the present disclosure may preferably include: a satellite signal receiving step (S100), a frequency converting step (S200), a satellite signal intensity detecting step (S300), a location calculating step (S400), an analyzing step (S500) and a tracking step (S600).

Each step is described in detail as follows.

In the satellite signal receiving step (S100), the satellite signal may be received from at least one satellite in the plurality of satellite environments by an antenna unit 100.

That is, in the satellite signal receiving step (S100), the satellite signal may preferably be received from the at least one satellite in the plurality of satellite environments by an antenna 110 of the antenna unit 100.

In the frequency converting step (S200), the antenna unit 100 may down-convert a frequency of the satellite signal received in the satellite signal receiving step (S100) to an intermediate frequency.

In detail, in the frequency converting step (S200), a satellite signal converter 120 of the antenna unit 100 may down-convert the frequency of the received satellite signal to the intermediate frequency. To this end, the satellite signal converter 120 may preferably be configured to include low noise block down converter (LNB). The satellite signal converter 120 may amplify the received satellite signal, remove noise included in the satellite signal and down-convert the frequency of the satellite signal to the intermediate frequency.

In the satellite signal intensity detecting step (S300), the antenna unit 100 may detect the intensity of the satellite signal having the frequency down-converted in the frequency converting step (S200).

In the satellite signal intensity detecting step (S300), the signal intensity detector 130 of the antenna unit 100 may preferably detect the intensity of the satellite signal having the down-converted frequency divided into two identical frequencies through a power divider (not shown).

In detail, in the satellite signal intensity detecting step (S300), the signal intensity detector 130 of the antenna unit 100 may preferably detect the intensity of the satellite signal by outputting an automatic gain control (AGC) signal having a set frequency.

Here, the frequency may be set through an operation of an indoor unit (IDU) in an antenna system shown in FIG. 1. However, the present disclosure does not include the IDU, and it is thus preferable to input the control signal for setting the frequency from the outside.

To this end, as shown in FIG. 4, it is preferable to further perform a controlling step (S10) in the satellite tracking method using the satellite tracking antenna system in the plurality of satellite environments according to an embodiment of the present disclosure.

In the controlling step (S10), various control signals for estimating and tracking the target satellite may be received from a user terminal 400.

As described above, in the controlling step (S10), there may be received the control signal for setting the frequency or various control signals such as tracking polarization setting and fine adjustment of the antenna and an on/off control signal of the antenna unit for each step.

In the satellite signal intensity detecting step (S300), the intensity of the satellite signal may preferably be detected only when the intensity of the satellite signal is greater than a predetermined threshold value or information on the intensity of the satellite signal may be transmitted to perform the location calculating step (S400) only when the intensity of the satellite signal is greater than the predetermined threshold value.

Through this configuration, it is preferable not to perform any further estimation or tracking for a satellite signal having a weak signal intensity among a plurality of satellite signals received by the antenna 110.

In the location calculating step (S400), the antenna unit 100 may calculate information on the satellite location corresponding to information on the intensity of the satellite signal detected in the satellite signal intensity detecting step (S300).

In other words, in the location calculating step (S400), the controller 140 of the antenna unit 100 may preferably calculate the information on the satellite location corresponding to the satellite signal detected in the satellite signal intensity detecting step (S300). That is, the controller 140 may preferably calculate elevation and azimuth angles of location where the satellite signal is detected and calculate the information on the satellite location.

Here, as described above, if a global positioning system (GPS) signal of the user terminal 400 is transmitted and used, the information on the location where the satellite signal is detected may become more accurate. It is thus possible to improve the accuracy in calculating the information on the satellite location by calculating the elevation and azimuth angles of the detected satellite signal.

In the analyzing step (S500), the antenna unit 100 may estimate the target satellite corresponding to the satellite signal by comparing and analyzing the calculated information on the satellite location in the location calculating step (S400) with pre-stored information on orbits of a plurality of satellites.

In detail, in the analyzing step (S500), the controller 140 of the antenna unit 100 may estimate a satellite having the closest orbit distance as the target satellite by comparing and analyzing the information on the satellite orbits stored and managed by the memory 141 with the calculated information on the satellite location, and then by calculating information on satellite orbit distances based on the antenna 110.

That is, the information on the satellite location corresponding to the detected satellite signal may be calculated by calculating the elevation and azimuth angles of the location where the corresponding satellite signal is detected, and the pre-stored information on the orbits of the plurality of satellites and the calculated information on the satellite location may be compared and analyzed.

Accordingly, the information on the satellite orbit distance may be calculated based on the location where the satellite signal is detected.

Based on this calculation, a satellite having the closest orbit distance among the calculated information on the satellite orbit distances may preferably be estimated as the target satellite.

In other words, the satellite having the information on the orbit distance closest to the location where the satellite signal is detected may be estimated as the target satellite.

In the tracking step (S600), the antenna 110 of the antenna unit 100 may be moved to an estimated location of the target satellite in the analyzing step (S500).

In the tracking step (S600), the antenna 110 may be moved to the estimated location of the target satellite through driving control of a motor 150 and a motor driver 160 to track the target satellite estimated through the controller 140. Then, it may be preferable that the antenna 110 moved in this way has a fixed position and the satellite signal is then transmitted to the satellite broadcasting receiver 200 and output through the output means 300. Here, it is most preferable that the satellite signal transmitted to the satellite broadcasting receiver 200 has the frequency down-converted to the intermediate frequency divided through the power divider.

That is, in other words, through the operations of these components, the satellite tracking antenna system in the plurality of satellite environments and the satellite tracking method using the same according to an embodiment of the present disclosure may receive the satellite signal by stochastically estimating and tracking the target satellite using the pre-stored information on the satellite orbits, without information on satellite network identity (NID) for every received satellite signal.

In addition, its maintenance is very easy because the target satellite is estimated using the information on the unchanged satellite orbits, and thus no separate update is required even though the satellite repeater information, the satellite broadcast information or the information on the satellite NID is changed. In addition, the present disclosure may be configured to have a low current antenna system by not using the IDU, thereby reducing battery consumption of a vehicle.

Through the above configuration, the satellite tracking antenna system in the plurality of satellite environments and the satellite tracking method using the same according to an embodiment of the present disclosure may configure a low power antenna system estimating and tracking the desired satellite (target satellite) in the plurality of satellite environments even without the IDU.

In addition, the present disclosure does not require the IDU, and it is thus possible to reduce the installation cost of the antenna system itself. In addition, the antenna unit may be directly connected to the satellite broadcasting receiver, and it is thus easier to connect and install the devices compared to those of the antenna system shown in FIG. 1, such that even an ordinary user may easily manage this system.

In addition, as the satellite environment changes, in a case where the firmware update of the antenna is performed to update the tracking frequency, polarization and the like of the target satellite, it is possible not only to upload the firmware update data of the antenna, but also to support interface for control the antenna unit through the communication with the user terminal.

Hereinabove, although the present disclosure is described by specific matters such as detailed components, exemplary embodiments and the accompanying drawings, they are provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to these exemplary embodiments, but the claims and all of modifications equal or equivalent to the claims are intended to fall within the scope and spirit of the present disclosure.

What is claimed is:

1. A satellite tracking antenna system comprising an antenna unit, wherein the antenna unit comprises:
   an antenna configured to receive a satellite signal from at least one satellite,
   a satellite signal converter configured to down-convert a frequency of the satellite signal received by the antenna to an intermediate frequency,
   a signal intensity detector configured to detect an intensity of the satellite signal having the intermediate frequency provided by the satellite signal converter,
   a memory configured to store information on orbits of a plurality of satellites, and
   a controller configured to track a target satellite corresponding to the satellite signal by using information on the intensity of the satellite signal detected by the signal intensity detector and the information on the orbits of the plurality of satellites stored in the memory,
   wherein the controller is further configured to track the target satellite corresponding to the satellite signal received by the antenna by at least:
      calculating elevation and azimuth angles associated with the satellite signal,
      calculating information on a satellite location corresponding to the satellite signal detected by the signal intensity detector using information on the calculated elevation and azimuth angles and the information on the intensity of the satellite signal detected by the signal intensity detector, and
      comparing the calculated information on the satellite location with the information on the orbits of the plurality of satellites.

2. The satellite tracking antenna system of claim 1, wherein the signal intensity detector is configured to detect the intensity of the satellite signal only when the intensity of the satellite signal is greater than a predetermined threshold value.

3. The satellite tracking antenna system of claim 2, wherein the controller is configured to determine a satellite having the closest orbit distance based on the satellite signal received by the antenna as the target satellite.

4. The satellite tracking antenna system of claim 3, wherein the antenna unit further includes a motor configured to move the antenna to an estimated location of the target satellite and a motor driver configured to drive the motor based on a driving signal of the controller.

5. The satellite tracking antenna system of claim 3, further comprising a user terminal having an application installed therein, the application is configured to generate a control signal for controlling the antenna unit based on an externally-input signal.

6. The satellite tracking antenna system of claim 5, wherein the antenna unit further includes a communicator to perform near field communication (NFC) with the user terminal, and
   wherein the communicator is configured to receive the control signal for detecting and tracking the target satellite through the near field communication (NFC) with the user terminal.

7. A satellite tracking method using a satellite tracking antenna system, comprising:
   receiving, by an antenna unit of the satellite tracking antenna system, a satellite signal from at least one satellite;
   down-converting, by the antenna unit, a frequency of the received satellite signal to an intermediate frequency;
   detecting, by the antenna unit, an intensity of the satellite signal having the down-converted frequency;
   calculating, by the antenna unit, elevation and azimuth angles associated with the satellite signal, and calculating, by the antenna unit, information on a satellite location corresponding to the satellite signal using information on the calculated elevation and azimuth angles and information on the intensity of the satellite signal;
   estimating, by the antenna unit, a location of a target satellite corresponding to the satellite signal based on the satellite signal received by the antenna by comparing and analyzing the calculated information on the satellite location with pre-stored information on orbits of a plurality of satellites; and
   moving, by the antenna unit, an antenna to the estimated location of the target satellite,
   wherein a satellite having the closest orbit distance is determined as the target satellite by comparing and analyzing the information on the satellite location with the pre-stored information on the orbits of the plurality of satellites, and then calculating information on satellite orbit distances based on the satellite signal received by the antenna.

8. The satellite tracking method of claim 7, wherein in detecting of the intensity of the satellite signal, the intensity of the satellite signal is detected only when the intensity of the satellite signal is greater than a predetermined threshold value.

9. The satellite tracking method of claim 7, further comprising receiving, by the antenna unit, a control signal for detecting and tracking the target satellite from a user terminal.

* * * * *